(12) United States Patent
Berry et al.

(10) Patent No.: US 9,944,255 B2
(45) Date of Patent: Apr. 17, 2018

(54) HEATED WINDSHIELD WIPER BLADE SYSTEM

(71) Applicants: Larry Berry, Elgin, IL (US); Jacqueline Berry, Elgin, IL (US)

(72) Inventors: Larry Berry, Elgin, IL (US); Jacqueline Berry, Elgin, IL (US)

( * ) Notice: Subject to any disclaimer, the term of this patent is extended or adjusted under 35 U.S.C. 154(b) by 235 days.

(21) Appl. No.: 15/019,769

(22) Filed: Feb. 9, 2016

(65) Prior Publication Data

US 2016/0272161 A1 Sep. 22, 2016

Related U.S. Application Data

(60) Provisional application No. 62/136,063, filed on Mar. 20, 2015.

(51) Int. Cl.
*B60S 1/38* (2006.01)

(52) U.S. Cl.
CPC .................. *B60S 1/3805* (2013.01)

(58) Field of Classification Search
CPC . B60S 1/3803; B60S 1/3805; H05B 2203/031
USPC .................. 15/250.05–250.09; 219/202, 203
See application file for complete search history.

(56) References Cited

U.S. PATENT DOCUMENTS

| | | | | |
|---|---|---|---|---|
| 2,721,351 A * | 10/1955 | Nitzel | ....................... | B60S 1/08 15/250.06 |
| 4,387,290 A * | 6/1983 | Yasuda | ................. | B60S 1/3805 15/250.07 |
| 4,670,933 A * | 6/1987 | Toplenszky | ........... | B60S 1/3805 15/250.07 |
| 2003/0020422 A1* | 1/2003 | Schmid | ................. | B60S 1/0818 318/445 |
| 2004/0010880 A1* | 1/2004 | Tobias | .................. | B60S 1/3805 15/250.06 |
| 2009/0070952 A1* | 3/2009 | Peng | ..................... | B60S 1/3805 15/250.06 |
| 2013/0193129 A1* | 8/2013 | Jones | .................... | B60S 1/3881 219/202 |

* cited by examiner

*Primary Examiner* — Gary Graham
(74) *Attorney, Agent, or Firm* — Shifrin Patent Law; Dan Shifrin

(57) ABSTRACT

A heated wiper blade system, comprising a windshield wiper blade, an elongated heating element embedded along the length of the blade, a mounting bracket configured to snap into a wiper arm of a vehicle and into which the wiper blade is securable, and a control unit electrically coupled to the heating element and configured to provide a current to the heating element.

8 Claims, 3 Drawing Sheets

HEATED WINDSHIELD WIPER BLADE SYSTEM

RELATED APPLICATION DATA

The present application is related to and claims the benefit of commonly-owned and U.S. Application Ser. No. 62/136,063 entitled SHELLY BLADE, filed on Mar. 20, 2015, which application is incorporated herein by reference in its entirety.

TECHNICAL FIELD

The present invention relates generally to the field of windshield wipers and more specifically relates to heated windshield wipers.

BACKGROUND ART

Winter can be a beautiful season, but if you live in the cold regions of the country, it becomes distinctly less beautiful as the months drag on. There's nothing so magical as that first snowfall—and if you could just stay inside by the fire all winter, reading books, cooking stew, and watching movies, you might have a grand time. Unfortunately, most of us have to go out, day in and day out; and in the long dark months of northern winter, that means we have to suit up in coats and scarves, gloves and hats an boots, shovel out the sidewalk, brush (or sometimes shovel) the snow off the car, scrape the windshield free of ice and snow, free the frozen windshield wiper blades, start the car and let it warm up over and over again, day after cold, gray day.

We have more products now to help us through the winter than we used to. Now, where people once went outside to start their cars and let them warm-up for a half-hour before leaving for work, they simply press a button on a remote-starter control and stay inside sipping coffee while the car warms up and the heater runs. But a remote-starter helps only so much. To clear the windshield of ice and snow, you'd have to let the vehicle idle and the defroster run for a long time. What's needed is a simple, easily use means of keeping the snow and ice from accumulating on the windshield and wipers to begin with.

SUMMARY OF THE INVENTION

Embodiments of the present invention provide a heated windshield wiper system that feature temperature controlled heating elements in the blades. Embodiments may include a key fob style remote and an automatic motion sensor to keep the wipers and windshield free of ice in cold conditions, thereby augmenting the vehicle's windshield defroster to keep visibility clear and the driver safe.

BRIEF DESCRIPTION OF THE DRAWINGS

The figures which accompany the written portion of this specification illustrate embodiments and methods of use for the present invention constructed and operative according to the teachings of the present invention.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
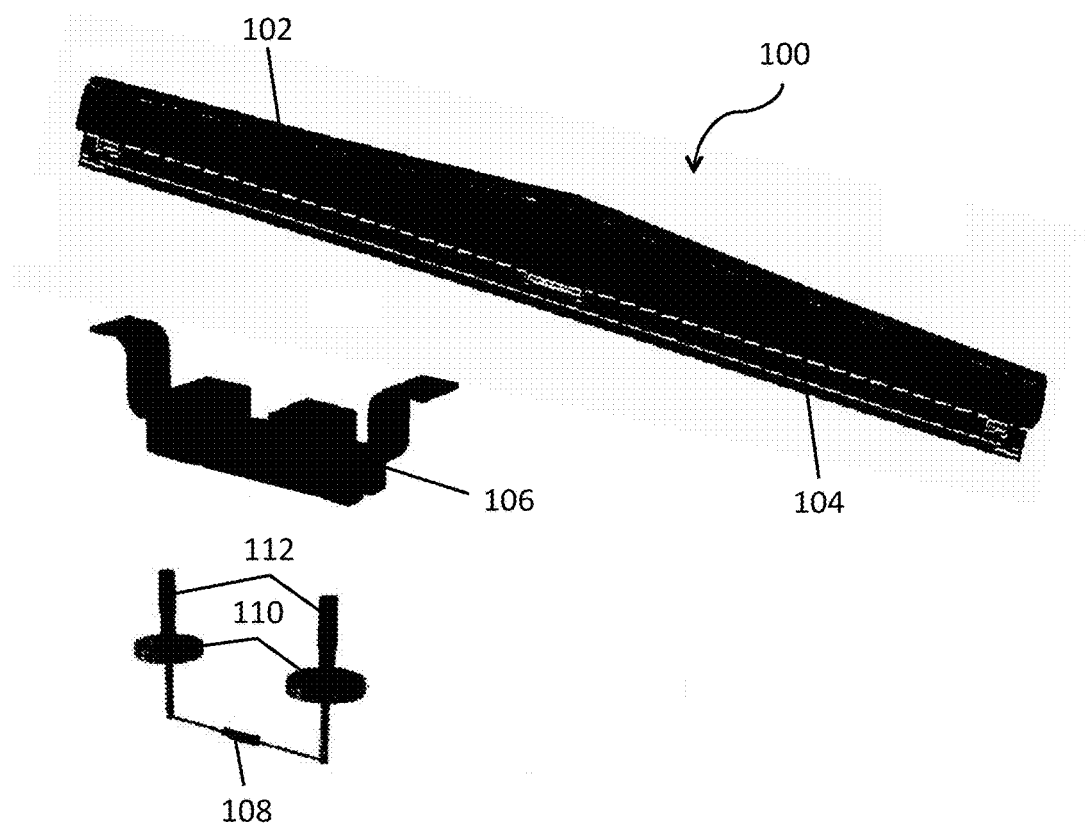
FIG. 1 illustrates an exploded view of an embodiment of a heated wiper system of the present invention.
Figure 2:
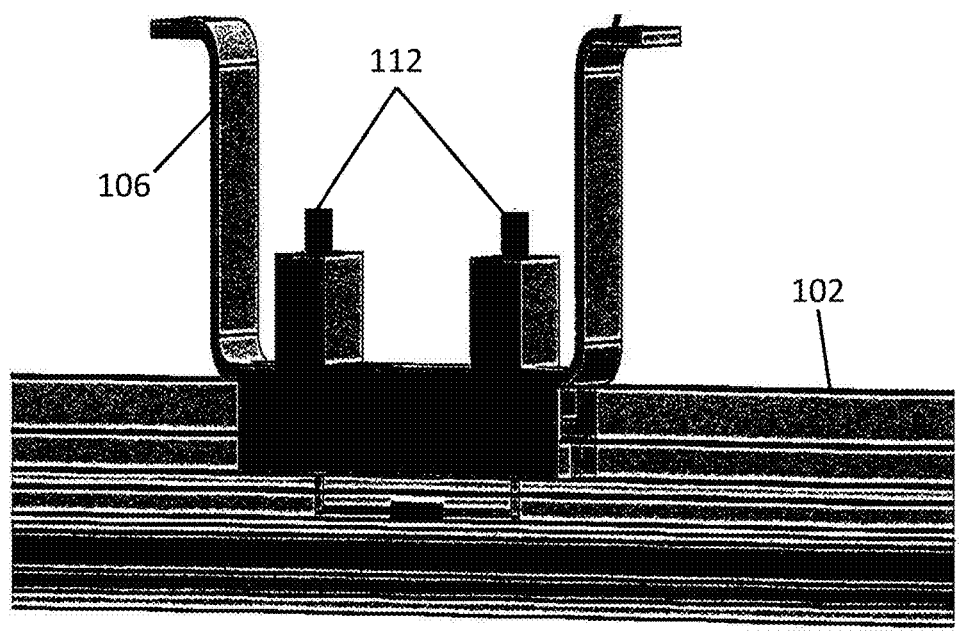
FIG. 2 illustrates a close-up view of the wiper mount of the heated wiper system of FIG. 1.

Disadvantages inherent in the current windshield wiper device art are addressed by embodiments of a heated windshield wiper blade of the present invention that may be provided for any vehicle. FIG. 1 illustrates an exploded view of an embodiment of a heated wiper system 100 of the present invention. The system 100 includes a wiper blade 102 and an elongated heating element 104, such as nichrome ribbon wire. The heating element 104 may be embedded or molded into the rubber or silicone blade 102 along the length of the blade 102. The heating element 104 heats the blade 102 when a current is passed through it. The system also includes a flexible wiper mounting bracket 106 to which the blade 102 is secured, as illustrated in FIG. 2. The system 100 may also include a temperature sensor 108. A pair of sensor contacts 110 couple the temperature sensor 108 to a pair of spring pin connectors 112 to which wires from a control module 200 (FIG. 4) are coupled. The wiper mounting bracket 106 provides snap-brackets which secure the blades 102 to the vehicle's wiper arms and may be retrofitted with a plug for the end of the wiper wires electrically coupled into the vehicle's electrical harness though an on/off switch 206 (FIG. 4).

Figure 3:
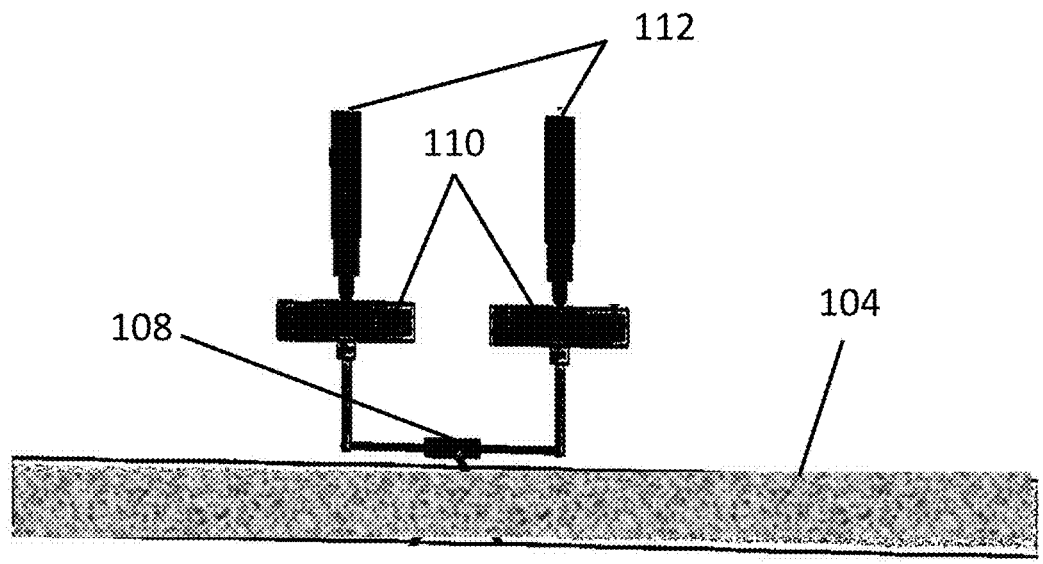
FIG. 3 schematically represents the heating element, temperature sensor, and connectors of the heated wiper system of FIG. 1.

The temperature sensor 108, contacts 110, and connectors 112 are housed within the wiper mounting bracket 106. FIG. 3 schematically represents the heating element 104, temperature sensor 108, and connectors 110, 112 of an embodiment of the heated wiper system 100 of the present invention.

Figure 4:
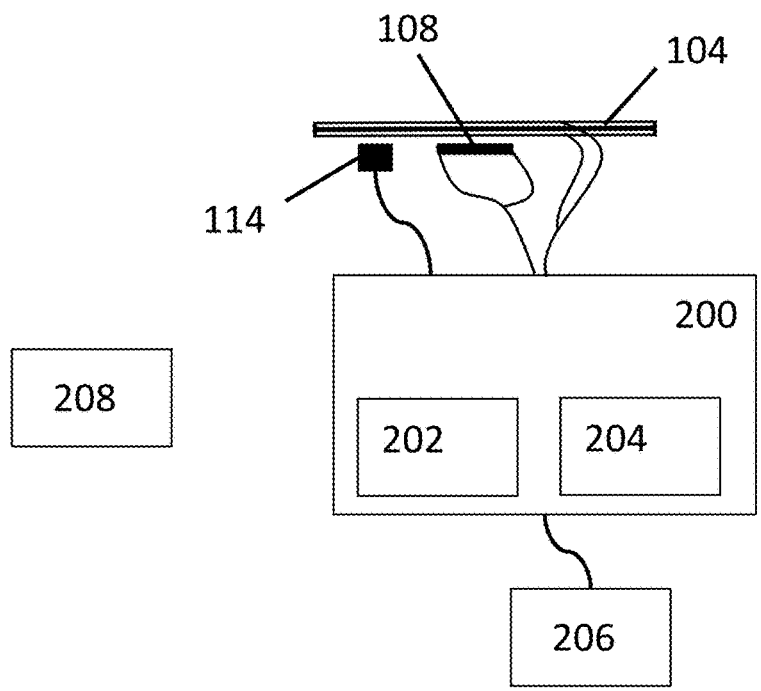
FIG. 4 is a block diagram of the electrical components of the heated wiper system of FIG. 1.

FIG. 4 is a block diagram of the electrical components of the heated wiper system 100. The heating element 104 and temperature sensor 108 are electrically coupled to a control module 200. The control module 200 includes a programmable control processor 202 and may include a wireless module 204 and is electrically coupled to the vehicle's battery to provide power for both the control module 200 and the heating element 104. A motion sensor 114 secured to the mounting bracket 106 may also be electrically coupled to the control module 200. Preferably, the control module 200 provides a pulse width modulated (PWM) current to the heating element 104. When present, the motion sensor 114 is secured within the wiper mounting bracket 106 or other location from which it can detect motion of the blade 102, as described below. The processor 202, and wireless module 204 may be housed together located, for example, under the dash in the cabin or under the hood of the vehicle. An on/off switch 206 is electrically coupled to the control module 200 and may be positioned in the cabin in a location that is convenient for the driver. The wired on/off switch 206 may be installed when the vehicle is manufactured or may be installed as an aftermarket product. A wireless remote 208, such as a key fob style device, in communication with the wireless module 204, may also be provided instead of the wired on/off switch 206, such as if the wiper system 100 is installed as an aftermarket product. Wireless communication may be via Bluetooth or any other suitable wireless means. The wired on/off switch 206 and the wireless remote 208 may also include the ability to allow the driver to adjust the temperature of the heating element 104.

In use, the driver of the vehicle on which a set of heated wiper systems 100 is installed may activate the systems 100 after turning on the vehicle and turning on the windshield wipers. It will be assumed that a pair of systems 100 are installed on the front windshield of the vehicle; a system 100 may also be installed on a rear window if the vehicle has a wiper on that window. As noted above, the systems 100 may be turned on using the on/off switch 206 or the wireless remote 208. As current is applied by the control module 200 to the heating elements 104, resistance in the heating elements 104 causes them to generate heat through the blades 102. As the blades 102 pass over the windshield, the heat melts snow and ice that may have accumulated on the windshield and prevents or reduces additional snow and ice from accumulating. In use, therefore, the heated wiper systems 100 may supplement the vehicle's defroster to keep the windshield clear.

If the systems 100 include the motion sensors 114, the processor 202 may be programmed to activate the heating elements 104 only when the wiper blades 102 are in motion and to deactivate the heating elements 104 when the blades 102 are at rest. Alternatively, the control module 200 may deactivate the heating elements 104 after the blades 102 have been at rest for a predetermined period, such as ten minutes. If the systems 100 include the temperature sensors 108, the processor 202 may be programmed to activate the heating elements 104 only when the ambient temperature drops below a predetermined near-freezing set point, such as 38°, and to deactivate the heating elements 104 when the temperature rises above that or another predetermined set point.

The heated wiper blade system 100 may be produced in all the standard sizes and lengths to fit cars, vans, SUVs, pickups, and trucks. Replacement wiper blades 102 with the embedded heating element 104 may also be provided separately.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A heated wiper blade system, comprising:
    a windshield wiper blade;
    an elongated heating element embedded along the length of the blade;
    a mounting bracket configured to snap into a wiper arm of a vehicle and into which the wiper blade is securable;
    a motion sensor adjacent the mounting bracket;
    a control unit electrically coupled to the heating element and the motion sensor and configured to provide a current to the heating element, the control unit programmed to activate the heating element only when the windshield wipers of the vehicle are in motion.

2. The heated wiper blade system of claim 1, further comprising a temperature sensor adjacent the mounting bracket and electrically coupled to the control unit.

3. The heated wiper blade system of claim 2, wherein the control unit is programmed to activate the heating element when the ambient temperature falls below a first predetermined set point and to deactivate the heating element when the ambient temperature rises above a second predetermined set point.

4. The heated wiper blade system of claim 1, wherein the processor is further programmed to deactivate the heating element when the windshield wipers of the vehicle have been motionless for a predetermined period of time.

5. The heated wiper blade system of claim 1, further comprising:
    a wireless module associated with the control unit; and
    a remote control in wireless communication with the wireless module whereby the user activates and deactivates the heating element remotely.

6. The heated wiper blade system of claim 1, wherein the control unit further comprises an adjustment to control a temperature of the heating element.

7. The heated wiper blade system of claim 1, wherein the control unit is configured to provide a pulse width modulated current to the heating element.

8. The heated wiper blade system of claim 1, wherein the heating element comprises a nichrome ribbon wire.

* * * * *